Patented Oct. 1, 1940

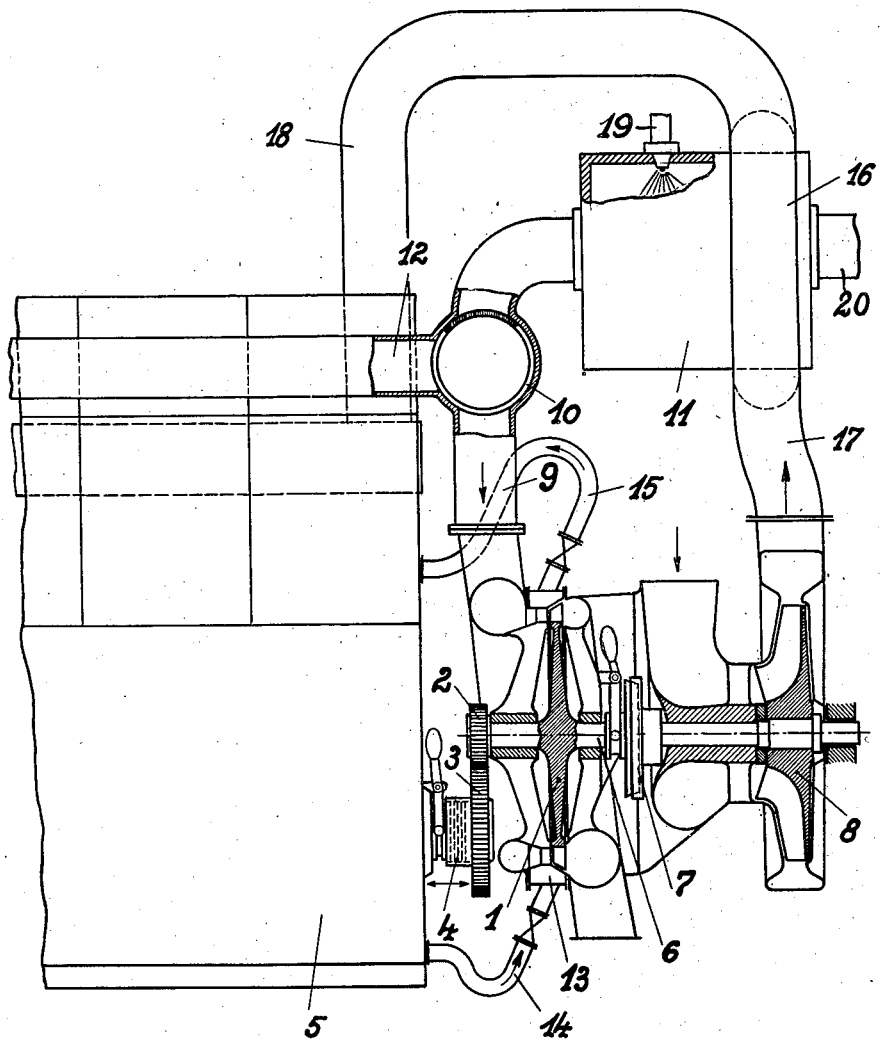

2,216,494

UNITED STATES PATENT OFFICE 2,216,494

INTERNAL COMBUSTION ENGINE

Oskar Kurtz and Alexander Garve, Augsburg, Germany, assignors to Maschinenfabrik Augsburg-Nürnberg A. G., Augsburg, Germany, a corporation of Germany Application October 21, 1938, Serial No. 236,287
In Germany October 21, 1937

7 Claims. (Cl. 60—11)

This invention relates to combustion engines and more particularly starting devices for the same.

One object of the invention is the provision of a starting device for an internal combustion engine such as an aircraft engine of the Diesel type, the starting device comprising a gas turbine which is supplied during starting conditions with hot gases from some source other than the main engine, the power produced by the starting turbine being transmitted to the engine by transmission means provided between the engine and the turbine.

Another object of the invention is the provision of a starting device of the character mentioned in which the turbine is coupled to an auxiliary mechanism and is supplied with combustion gases from the engine during normal operating conditions of the engine.

Another object of the invention is the provision of a starting device of the character mentioned and including a gas turbine provided with a chamber or chambers arranged in the heated zone of the turbine and having connection with the engine for warming fluid supplied to the engine.

Other objects and advantages of the invention will be apparent from the following description, the appended claims and the accompanying drawing, in which:

The figure illustrates a power system including a starting device embodying the present invention.

Referring more particularly to the drawing, the numeral 5 designates a main drive engine such as an internal combustion engine of the Diesel type, the present invention being particularly adaptable to Diesel engines employed for driving airplane propellers, and the like. The starting of engines and more particularly Diesel aircraft engines presents considerable difficulties, especially in winter when low outside temperatures exist. Since portable electrical or compressed air starting devices are not available everywhere although they might be available at the larger airports, a special starting device should be provided in every airplane. The starting devices ordinarily used such as electrically driven flywheel starters and compressed air starters must necessarily be made of small capacity and light weight and are not satisfactory in general to produce a sufficiently rapid rotation of a Diesel aircraft engine to form a reliable starting means, since the engine itself and the oil which it uses may be quite cold under starting conditions. In accordance with the present invention, however, these objections are overcome, the starting power being produced by a turbine which may be supplied with hot gases from some source other than the engine itself and which may furnish power for starting the engine through suitable power transmission means.

The rotor of the starting turbine 1, as shown in the drawing, may be connected with the crank shaft of the engine 5 by suitable transmission means so that the turbine may be operated and then connected to the engine by a mechanical gear connection or through power transmission means such as an air compressor that furnishes starting air to the engine cylinders. As herein shown the power transmission means between the turbine and the engine comprises the drive gears 2 and 3 and a coupling device 4 which operates to mechanically connect the turbine shaft with the engine shaft after the turbine has been started and which may be disengaged after the engine has been started. The coupling device 4 may be a clutch of any usual construction adapted for operation by a manually operable lever which shifts a grooved axially movable collar to cause engagement of clutch disks splined on the motor shaft with clutch disks splined on the rim portion which carries the gear 3. The gear 3 may be large enough to serve as a flywheel so as to store large amounts of energy supplied from the turbine 1 until the gear 3 is connected to the engine shaft by operation of the coupling 4.

Under starting conditions when the engine is cold, hot gases are supplied to annular inlet chamber of the turbine 1 through the supply pipe 9 which may be placed in communication with a combustion chamber 11 by operating the starting sleeve valve 10 counterclockwise from the position shown, thus cutting off communication between the exhaust pipe 12 of the engine and the supply pipe 9 and establishing communication between the combustion chamber 11 and the supply pipe 9. The combustion chamber 11 is preferably supplied with fuel through a suitable fuel injection nozzle 19, the fuel being of the same character as the fuel supplied to the combustion engine 5, and the burned products of combustion coming from the chamber 11 furnish the power for starting the turbine and bringing it up to the required speed to furnish adequate starting power for the engine 5. After the engine 5 has been started, the valve 10 may be turned so that the turbine will then be operated by exhaust gases supplied from the exhaust pipe 12 of the engine.

When starting with a cold engine and with the sleeve valve 10 shutting off communication to the pipe 12, air under pressure may be supplied temporarily from a suitable source of compressed air to the chamber 11, through the pipe 20 leading to that chamber. Fuel is also supplied through the fuel injection nozzle 19, and the fuel ignited by any conventional ignition means. At this time the coupling 7 between the turbine shaft 6 and the compressor 8 may be disengaged. After the engine has been started from the turbine, the supply of fuel to the injection nozzle 19 is cut off.

In accordance with the present invention, the turbine 1 also serves for driving a machine auxiliary to the engine 5, such as the compressor 8 which may be used during operating conditions to supply scavenging or charging air to the cylinders of the engine 5. As shown, the turbine shaft 6 is connected by means of an operable coupling 7 to the shaft of the blower 8 so that the blower may be disconnected from the turbine while the latter is being started and then connected so as to be operated by the turbine during normal operating conditions of the engine 5 to furnish an auxiliary supply of air to the engine. The weight of the turbine is therefore not a dead weight during normal operating conditions. The coupling 7 may be a suitable clutch adapted for operation by a manually operable lever which shifts a clutch plate splined on shaft 6 into or out of engagement with a clutch plate fixed on the shaft of blower 8.

The turbine is also employed to warm a fluid or fluids supplied to the engine 5. These fluids such as the cooling water of the engine, the combustion air supplied to the engine, the lubricating engine oil, and the oil which is burned in the combustion chambers of the engine, are supplied to chambers arranged in a heated zone of the turbine and surrounding the same. Such a heating chamber is indicated by reference numeral 13 which surrounds the turbine, the cooling water from the engine, for example, being supplied under starting conditions through the conduit 14 and returning to the engine through the conduit 15 after passing through the heating chamber of the turbine. After the engine 5 has been started and has been warmed up, the flow of cooling water through the pipes 14 and 15 may be stopped. The additional chambers for preheating the other fluids supplied to the engine such as the lubricating oil and combustion air may be similarly arranged. Furthermore, the outer surface of the combustion chamber 11 may also be used during starting conditions for preheating the fluids supplied to the engine 5 by conducting those fluids through chambers or passages surrounding the combustion chamber 11. Such a heating-passage is indicated by reference numeral 16 surrounding the combustion chamber 11, the air from the compressor 8 being supplied through the conduit 17, the heating-passage 16 and the conduit 18 to the engine cylinders.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination with a power engine of the Diesel type, starting means therefor comprising a gas turbine, a combustion products generator independent of the engine for supplying hot combustion gases to the turbine to operate the same, power transmission means between the turbine and the engine for connecting and disconnecting the turbine and the engine, and means for supplying combustion gases from the engine to the turbine during normal operating conditions of the engine.

2. In combination with an internal combustion engine of the character described, starting means therefor comprising a gas turbine, a machine auxiliary to the engine and operated by the turbine during normal operating conditions of the engine, means for supplying exhaust gases from the engine to the turbine during normal operating conditions of the engine, a combustion products generator, independent of the engine for supplying hot gases to the turbine to operate the same during starting conditions, and power transmission means between the turbine and the engine for connecting and disconnecting the turbine and the engine.

3. In combination with an internal combustion engine of the character described, starting means therefor comprising a gas turbine, a machine auxiliary to the engine and operated by the turbine during normal operating conditions of the engine, means for disconnecting the turbine from the auxiliary machine when the turbine is being started, means for supplying exhaust gases from the engine to the turbine during normal operating conditions of the engine, means independent of the engine for supplying hot gases to the turbine to operate the same during starting conditions, and power transmission means between the turbine and the engine for starting the engine.

4. In combination with a power engine of the Diesel type, starting means therefor comprising a gas turbine, means independent of the engine for supplying hot gases to the turbine to operate the same, power transmission means between the turbine and the engine for starting the engine, a conduit in a heated zone of the turbine for warming fluid supplied to the engine, and means for supplying fluid from said conduit to the engine.

5. In combination with a power engine of the Diesel type, starting means therefor comprising a gas turbine, a blower auxiliary to the engine and operated by the turbine during normal operating conditions of the engine, means for supplying exhaust gases from the engine to the turbine during normal operating conditions of the engine, means independent of the engine for supplying hot gases to the turbine to operate the same during starting conditions, transmission means between the turbine and the engine for starting the engine from the turbine, and a conduit in a heated zone of the turbine and in communication with the engine for warming fluid supplied to the engine.

6. In combination with an internal combustion engine of the character described, starting means therefor comprising a gas turbine, an air compressor auxiliary to the engine and operated by the turbine during normal operating conditions of the engine, means for supplying exhaust gases from the engine to the turbine during normal operating conditions of the engine, a combustion products generator independent of the engine for supplying hot combustion gases to the turbine to operate the same during starting conditions, a clutch between the turbine and the air compressor, and means operable to couple the turbine to the engine to start the engine from the turbine.

7. In combination with an internal combustion engine of the character described, starting means therefor comprising a gas turbine, a machine auxiliary to the engine and operated by the turbine during normal operating conditions of the engine, means operable to disconnect the turbine from the auxiliary machine when the turbine is being started, means for supplying exhaust gases from the engine to the turbine during normal operating conditions of the engine, a combustion products generator independent of the engine for supplying hot combustion gases to the turbine to operate the turbine during starting conditions, and means operable to connect the turbine to the engine after the turbine has been started.

OSKAR KURTZ.
ALEXANDER GARVE.